Patented Sept. 12, 1933

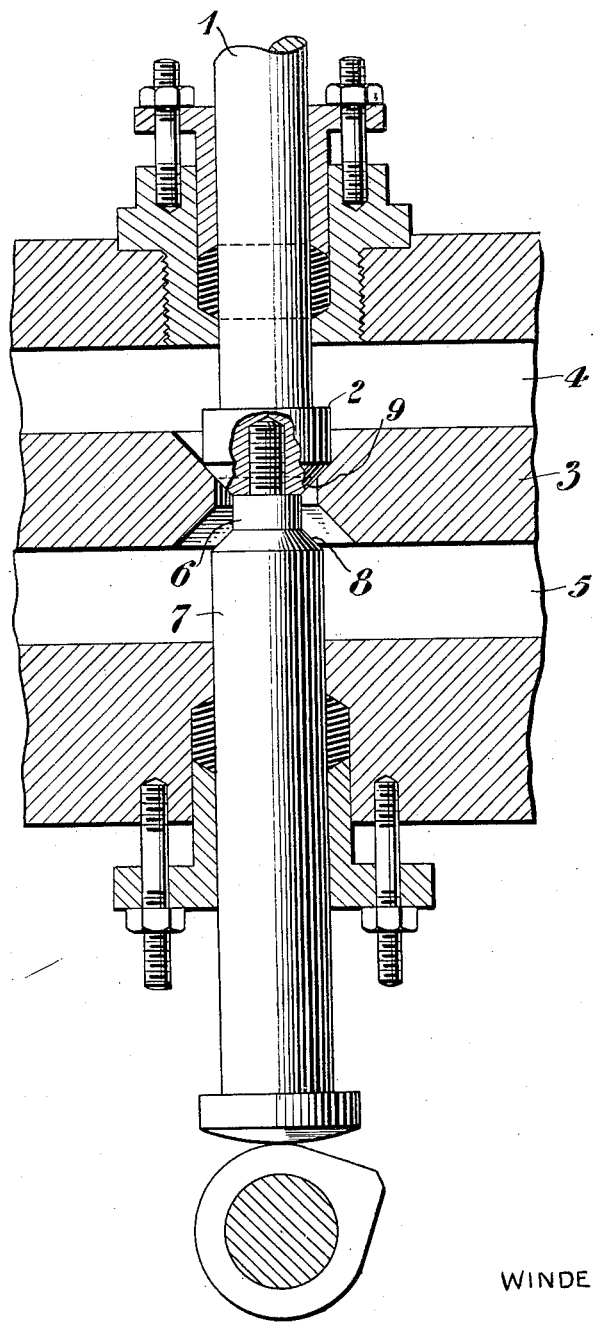

1,926,529

UNITED STATES PATENT OFFICE 1,926,529

BALANCED VALVE

Winder E. Goldsborough, South Norwalk, Conn., assignor to Doherty Research Company, New York, N. Y., a corporation of Delaware Application May 31, 1928. Serial No. 281,812

4 Claims. (Cl. 251—159)

This invention relates to a valve for controlling the flow of fluids under high pressure.

In internal combustion engines particularly of the solid injection type and in some other types of power plants it is necessary to supply fuel under high pressures ranging from 2000 to 10,000 lbs. or more per sq. inch to a combustion chamber. Usually the supply to such engines is intermittent and the quantity of fuel supplied at each injection must be precisely regulated. Because of the small quantities of fuel handled at each injection it is the usual practice to provide a pump having a larger capacity than the charge used and to by-pass the portion of the fuel not used, controlling this action by some appropriate form of valve. This valve may be located between the pump and the engine cylinder or may be provided in the pump itself, either as an additional valve or as a combined suction and by-pass valve.

Because of the high pressures to which such valves are subjected it has been necessary to provide very rugged actuating mechanism to control them. It has been proposed to balance such valves against the high pressure in the fuel chamber but no such construction has been particularly successful in reducing the shock upon the actuating mechanism for the reason that as soon as the valve was moved it immediately became unbalanced.

It is the object of this invention to provide a valve which will be substantially balanced in both open and closed positions so that the actuation thereof may be effected without great strain upon the actuating mechanism.

The drawing is a side elevation of the valve, partly in section, showing the same closing the by-pass passage, which is shown in section.

Referring to the accompanying drawing:—1 indicates the stem of a relief valve, the shoulder 2 of which when acted upon by the high pressure of the fuel in passage 4 forces the valve against its seat in a wall 3. The passage 4 may be either the pump chamber or the fuel passage between the pump and the engine cylinder. 5 indicates a passage through which the excess fuel or other fluid flows when the stem 1 is lifted. Attached to the stem 1 by means of a shank 6 which is screw-threaded thereto, is a second stem 7 having a face 8 opposed to a face 9 of the valve. When the fuel flows through the relief valve port upon lifting of the stem 1 by the usual actuating mechanism, the high pressure acts upon the face 9 of the valve. Were it not for the opposite face 8 which is exposed to the flow of fuel passing at high velocity through the open valve passage this high pressure would tend to press the valve upwardly with great force, thereby subjecting the actuating mechanism to very severe strains. The arrangement shown prevents such strains and provides a substantially balanced relief valve while in the open position. It is obvious that the actuating mechanism may act either upon stem 1 or upon stem 7 or upon both alternately and that governor control means may be associated with such actuating mechanism for regulating the extent or the time of lift of the valve in order to variably control the quantity of fuel or other liquid supplied by the pump. Suitable actuating and control mechanisms are well known in connection with liquid fuel pumps and need not here be described.

It may readily be seen that valves constructed in accordance with my invention will also be useful as distributing valves in the common rail system of fuel supply in solid injection engines.

In the arrangement shown, a small area formed by shoulder 2 is provided which is acted upon by the fuel or other liquid in chamber 4. This tends to keep the valve seated. Such area is not entirely essential to the construction and may be omitted so that the stem 1 will have the same cross-sectional area throughout. The valve would then be seated entirely by the actuating mechanism and would be capable of upward movement entirely without resistance of the pressure in chamber 4. However, a small pressure area, as shown, is to be preferred. It is understood that the words "substantially balanced" in the following claims are intended to include perfect balance such as may be attained by omitting the shoulder 2, or by putting a shoulder similar to 2 on stem 7, and by giving stems 1 and 7 the same diameter.

While my invention is particularly applicable to fuel pumps of internal combustion engines it is obviously suited to the control of fluid under high pressure in other situations.

Having described the invention, what is claimed as new is:

1. A valve for controlling the flow of liquids under high pressure comprising a valve stem, a valve face forming the end of said stem, a shoulder forming a face of small area tending to move said valve toward its closed position when acted upon by the controlled liquid, a second stem attached to the valve end of said first mentioned stem and having a face opposed to said valve face and exposed to the pressure of the liquid when the valve is open for limiting the movement of the valve when the same is unseated.

2. In a device of the type described, a pressure chamber, a discharge passage, a wall having an orifice providing communication between said pressure chamber and said discharge passage, a valve having a face coacting with a seat surrounding said orifice, a stem for said valve extending through said pressure chamber and having a shoulder thereon providing a surface of less area than the effective cross-sectional area of said orifice, a second stem detachably connecting to said valve extending through said discharge passage, having a face directly opposing said face and of larger diameter than the diameter of said orifice.

3. In a device of the type described, a pressure chamber, a discharge passage, a wall having an orifice providing communication between said pressure chamber and said discharge passage, a valve stem extending through said pressure chamber, a valve face forming the end of said stem and controlling said orifice, a second stem detachably connected to the valve end of said first stem by a reduced portion extending through said passage and having an enlarged portion of a diameter greater than that of said orifice sufficiently close thereto to be exposed to the surge pressure of the liquid when the valve is open.

4. A valve mechanism for controlling the flow of fluid under high pressure, comprising a valve stem, a valve face forming the end of said stem, an orifice forming a double seat, one of which is controlled by said valve, a second stem attached to said valve end of said first stem and having a second valve face opposed to said first valve face and controlling the second valve seat of said orifice, a shoulder forming a face of small area on said first mentioned stem above its valve, whereby the valve automatically closes as soon as the liquid pressure is equalized around it.

WINDER E. GOLDSBOROUGH.